(12) United States Patent
Miller et al.

(10) Patent No.: US 8,337,731 B2
(45) Date of Patent: Dec. 25, 2012

(54) ARTICLE COMPRISING A DRY FABRIC SEAL FOR LIQUID RESIN MOLDING PROCESSES

(75) Inventors: Alan K. Miller, Santa Cruz, CA (US); Stephen L. Bailey, Los Gatos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 204 days.

(21) Appl. No.: 12/484,824

(22) Filed: Jun. 15, 2009

(65) Prior Publication Data

US 2009/0309248 A1    Dec. 17, 2009

Related U.S. Application Data

(60) Provisional application No. 61/061,203, filed on Jun. 13, 2008.

(51) Int. Cl.
*B29C 70/36* (2006.01)

(52) U.S. Cl. ....... 264/40.4; 264/563; 264/546; 264/257; 264/279; 425/147

(58) Field of Classification Search ................. 264/40.4, 264/563, 561, 546, 257, 279; 425/147
See application file for complete search history.

(56) References Cited

U.S. PATENT DOCUMENTS

| | | | |
|---|---|---|---|
| 2,751,320 A * | 6/1956 | Hopkins et al. | 156/180 |
| 3,067,803 A * | 12/1962 | Fleury | 156/431 |
| 3,336,176 A * | 8/1967 | Medney | 156/173 |
| 3,579,402 A * | 5/1971 | Goldsworthy et al. | 156/392 |
| 3,853,656 A * | 12/1974 | McNeely et al. | 156/172 |
| 3,975,479 A * | 8/1976 | McClean | 264/102 |
| 4,369,224 A * | 1/1983 | Cordts et al. | 428/301.4 |
| 4,558,971 A * | 12/1985 | David | 405/158 |
| 4,626,306 A * | 12/1986 | Chabrier et al. | 156/180 |
| 4,737,527 A * | 4/1988 | Maranci | 523/205 |
| 4,886,562 A * | 12/1989 | Pinson | 156/172 |
| 4,894,292 A * | 1/1990 | Dibuz et al. | 428/524 |
| 5,151,277 A * | 9/1992 | Bernardon et al. | 425/112 |
| 5,194,189 A * | 3/1993 | Papastavros et al. | 264/495 |
| 5,426,271 A * | 6/1995 | Clark et al. | 200/84 C |
| 5,556,496 A * | 9/1996 | Sumerak | 156/166 |
| 5,665,301 A * | 9/1997 | Alanko | 264/571 |
| 5,721,047 A * | 2/1998 | Thicthener et al. | 428/368 |
| 5,747,151 A * | 5/1998 | Tingley | 428/299.1 |
| 6,299,819 B1 * | 10/2001 | Han | 264/510 |
| 6,364,976 B2 * | 4/2002 | Fletemier et al. | 156/62.2 |
| 6,849,332 B1 * | 2/2005 | Ables et al. | 428/378 |
| 7,413,694 B2 * | 8/2008 | Waldrop et al. | 264/257 |
| 8,025,834 B2 * | 9/2011 | Miller et al. | 264/557 |
| 2002/0117252 A1 * | 8/2002 | Baldwin | 156/178 |

(Continued)

*Primary Examiner* — Joseph Del Sole
*Assistant Examiner* — Nahida Sultana
(74) *Attorney, Agent, or Firm* — Kaplan Breyer Schwarz & Ottesen, LLP

(57) ABSTRACT

A dry fabric seal for use with tooling for liquid resin molding processes and a method for creating the seal are disclosed. In the illustrative embodiment, the seal comprises an annular resin reservoir, a level of resin within the reservoir, a device for controlling the resin level, and a perforated pressure plate that forms one wall of the reservoir. The seal is created by controlling the level of resin between the tooling (e.g., the inner and outer molds, etc.) so that air cannot leak in (for vacuum processes) or out (for pressurized processes) between the fibers in the fabric near the top of the molds.

15 Claims, 3 Drawing Sheets

U.S. PATENT DOCUMENTS

2003/0227107 A1* 12/2003 Stewart .................. 264/236
2005/0132551 A1* 6/2005 Voges .................. 29/81.12
2007/0145622 A1* 6/2007 Cicci et al. .................. 264/40.1
2010/0276848 A1* 11/2010 Chen .................. 264/526

* cited by examiner

ARTICLE COMPRISING A DRY FABRIC SEAL FOR LIQUID RESIN MOLDING PROCESSES

STATEMENT OF RELATED CASES

This case claims priority of U.S. Provisional Pat. Appl. No. 61/061,203 filed Jun. 13, 2008, which is incorporated by reference herein. This case is related to U.S. patent application Ser. No. 12/484,779 entitled Process and Apparatus for Molding Continuous-Fiber Composite Articles filed on even date herewith and which is incorporated herein by reference.

FIELD OF THE INVENTION

The present invention relates to composite materials in general, and, more particularly, to continuous-fiber composite materials.

BACKGROUND OF THE INVENTION

There is growing interest in Ocean Thermal Energy Conversion ("OTEC") systems as a means of carbon-free electric power generation. OTEC systems exploit the temperature difference between the warm surface waters of tropical seas and the cold waters of the deep ocean to generate electricity.

An OTEC system, such as closed-loop OTEC system 100 depicted in FIG. 1, usually resides on floating platform, ship, or barge 102. Key components of system 100 include closed-loop conduit 104, evaporator 106, warm water pipe 108, turbo-generator(s) 110, condenser 112, and cold water pipe 116.

Closed-loop conduit 104 contains working fluid 103, such as ammonia, etc. In operation, the liquid working fluid is pumped to evaporator 106. Warm surface water is also conducted to the evaporator via warm water pipe 108. Heat transferred from the water vaporizes the low-boiling point working fluid.

The vaporized working fluid flows to turbo-generator 110, where it is used to rotate a turbine. The turbine, in turn, drives an electrical generator to produce electrical energy. After the vaporized working fluid transits turbo-generator 110, it is condensed in condenser 112. Condensation is effected using cold sea water piped up from the deep ocean via cold water pipe 116. The now-liquid working fluid is pumped to evaporator 106 via pump 114 and the cycle continues.

Although conceptually quite simple, an OTEC system presents certain manufacturing challenges. Consider, for example, cold water pipe 116. To retrieve cold water, the cold water pipe extends vertically downward into the ocean about 1000 meters or more. As a consequence of the small temperature differential between the cold and warm waters that drives the OTEC process, this pipe must convey an exceedingly large quantity of water to the condenser to meet its duty requirements. Consequently, in addition to its extraordinary length, the cold water pipe must have a very large diameter. In fact, for a commercial-scale plant, the cold water pipe is likely to have a diameter of about 30 feet. To fabricate, transport, and install such pipe is a substantial undertaking.

Due to certain advantageous properties compared to metals (e.g., lighter weight, greater strain tolerance, better corrosion resistance, etc.) a polymer-matrix continuous-fiber composite material is potentially a good material from which to fabricate the cold water pipe. A variety of processes are available for producing suitable composite materials.

At 1000 meters or more in length, an OTEC cold water pipe is far too long to be molded in a single production run (commonly referred to as a "single shot") using these processes. Rather, a stepwise or "multi-shot" technique would be used. Using a multi-shot technique, the cold water pipe would be formed by molding a plurality of discrete, shorter pipe sections that are then connected by mechanical joints or adhesive bonding. Examples of other items that are typically fabricated via a multi-shot technique include smokestacks and tunnel liners.

Although the multi-shot technique can be used to form the cold water pipe, the resulting joints are not as strong as if the laminate were continuous across the joints. In other words, the pipe would be stronger if there were no joints. And these joints exhibit other disadvantages as well, including increased weight, complexity, and lower reliability than the composite material. Furthermore, there is considerable difficulty and expense to transporting 1000 meters worth of 30-foot diameter pipe over land and water to its destination (i.e., the floating platform).

The fabrication of an OTEC cold water pipe is therefore a challenging task for which no satisfactory approach currently exists.

SUMMARY OF THE INVENTION

In U.S. patent application Ser. No. 12/484,779 entitled "Process and Apparatus for Molding Continuous-Fiber Composite Articles," a new way to mold very tall and very wide articles is disclosed. That disclosure teaches how, while fabricating articles via a series of discrete steps or "shots," it is possible to maintain complete continuity of fibers and fiber geometry between steps. As a consequence of this approach, the finished article possesses the same continuous-fiber configuration, and the concomitant advantages thereof, as if it were molded in one very long piece.

FIG. 2 depicts a simplified representation of apparatus 200 for fabricating continuous-fiber composite articles, as disclosed in the aforementioned reference. In the embodiment depicted in FIG. 2, apparatus 200 is field processing material to fabricate a cold water pipe for an OTEC plant. Processing is taking place on floating platform 202.

In operation, fabric 208 from rolls 206 in fabric storage region 204 is fed to molding region 210. In some embodiments, a plurality of planks of "core" material is also introduced into the molding region. The core material, which in the illustrative embodiment is available as a plurality of plank-like segments, forms a cylindrical shape or ring when assembled and positioned in molding region 210. This core ring (cylindrical or otherwise) establishes the basic shape for the workpiece being produced in the molding region.

Fabric 208 is disposed on both sides of the core. Resin is infused into the fabric and then cured, forming workpiece 218. This workpiece represents only a portion or segment of the article being fabricated; in other words, it is the workpiece formed in a single "shot." In fact, workpiece 218 is the second workpiece to be fabricated; workpiece 216, which extends beneath molding region 210 into the water, had been previously fabricated.

With respect to earlier-formed workpiece 216, as it cured, lower seal 214 of molding region 210 was released and the brakes (not depicted) on fabric rolls 206 were released. This enables workpiece 216 to be released from molding region 210 downward into the ocean. Since there is continuity of fiber between the workpiece and the rolls of fabric, as workpiece 216 was released from molding region 210, additional fabric 208 was drawn from rolls 206 into the molding region. Additional core material is positioned in the molding region at the same time and the process was re-run to form the second workpiece; in the example, workpiece 218. The second workpiece has continuity of fiber with the first workpiece as well as the fiber on the rolls. The process is repeated, workpiece by workpiece, until the "growing" article reaches its desired length.

The process disclosed in previously referenced U.S. patent application Ser. No. 12/484,779 requires placing molding region 210 under vacuum at times. In this stepwise process, during any one step, there will a boundary between the portion of the work-piece being processed and the dry fabric connected to it but not being processed. In the illustrative embodiment of the apparatus 200, the inventors recognized that to avoid having to create a gas-tight seal between fabric supply region 204 and molding region 210 (i.e., to maintain positive pressure in the fabric supply region and vacuum in the molding region), the fabric supply region, as well as the molding region, should be placed in fluidic communication with one another and provided with the capability of being placed under vacuum.

In other embodiments, however, fabric supply region 204 is not in fluidic communication with molding region 210. In such embodiments, a seal must be created between the portion of the workpiece being processed and the dry fabric connected to it but not being processed.

In a normal, relatively small-size work-piece, seals of various types (e.g., rubber knife-edge seals, adhesive sealant tape, etc.) are placed at the boundaries of the work-piece. This prevents in-leakage of air during mold evacuation. But if these types of seals were to be used across the dry fabric at the top of the work-piece being processed via the new stepwise process referenced above, air would leak between the fibers of the fabric, thereby defeating the seal.

The illustrative embodiment of the present invention is a seal for use with the stepwise molding process described above and a method of establishing a seal. The seal enables a vacuum to be pulled on the section being processed without excessive amounts of air leaking in between fibers of the fabric. For resin transfer molding "RTM" (as opposed to vacuum assisted resin transfer molding—VARTM—aspects of which are used in the process disclosed in Ser. No. 12/484, 779, once the mold is filled with resin, the resin pressure inside the mold during cure generally exceeds atmospheric pressure. A driving force therefore exists for the resin to leak out of the mold. By means of its features, the illustrative embodiment of the present invention also retards outward leakage of resin during cure, while still maintaining the desired fiber geometric continuity and allowing the fibers far from the mold to stay dry.

In accordance with the illustrative embodiment, the upper seal comprises an annular resin reservoir, a supply of liquid catalyzed resin in the reservoir, a means for actively controlling the level of the liquid resin, and a perforated pressure plate. A method for sealing an interface between dry fabric in a fabric-storage region and fabric in a molding region comprises feeding the fiber to the molding region, wherein continuity of fiber is maintained between fabric in a fabric-storage region and fabric being processed in a molding region; and maintaining a level of resin in the molding region such that fabric being processed that is near the interface remains full of resin.

In conjunction with the resin reservoir and an active control system, resin in the reservoir is maintained at a level that is high enough to ensure that the fabric in the upper seal area stays filled with resin. This resin blocks the air that would otherwise flow easily between the fibers, thereby accomplishing its function as a seal—a vacuum seal in this case. Although the level of the resin in the reservoir must be "high enough," it cannot be "too high." In particular, the active control system ensures that the resin level in the reservoir does not rise to a level at which "wicking" of the resin up the fibers, which would carry the resin above the pressure plate, does not occur.

Eventually, the catalyzed resin in the mold cures and hardens to become a portion of the composite component. In this fashion, the entire region that is filled with liquid resin at the start of any one processing step and filled with cured resin at the end of that step, is maintained in the desired configuration and achieves the desired fiber volume fraction.

DETAILED DESCRIPTION

Definitions. The terms appearing below are provided with the follow explicit definitions for use in this description and the appended claims.

Continuous-fiber composite means a fiber composite in which fibers are continuous throughout that the composite, as opposed to being chopped or short (i.e., discontinuous).

Shot refers to the amount of resin that is required to fill a mold cavity. A "multi-shot" article requires multiple, sequential resin fills and cures within the mold cavity.

Workpiece means the structure that is produced or the assemblage (e.g., core, fiber, resin) that will form that structure in a single shot in the molding region. In the context of multi-shot articles, the workpiece therefore represents a portion or segment of the final composite article (e.g., a segment of the cold water pipe, etc).

Tool(ing) refers to a solid entity/surface against which the composite material is molded and forms the shape of the molded article as the liquid resin transforms into a solid.

Continuity of fiber means that there is no discontinuity or break in fibers between the workpieces that compose a multi-shot composite article. To achieve this means that there must be no discontinuity in fibers between:
  fiber in a supply region and fiber in the molding region of an apparatus for molding composite articles, before or after resin is introduced to the molding region;
  fiber in the molding region, either before or after resin is introduced, and a workpiece; and
  fiber in the supply region and a workpiece.

Figure 1:
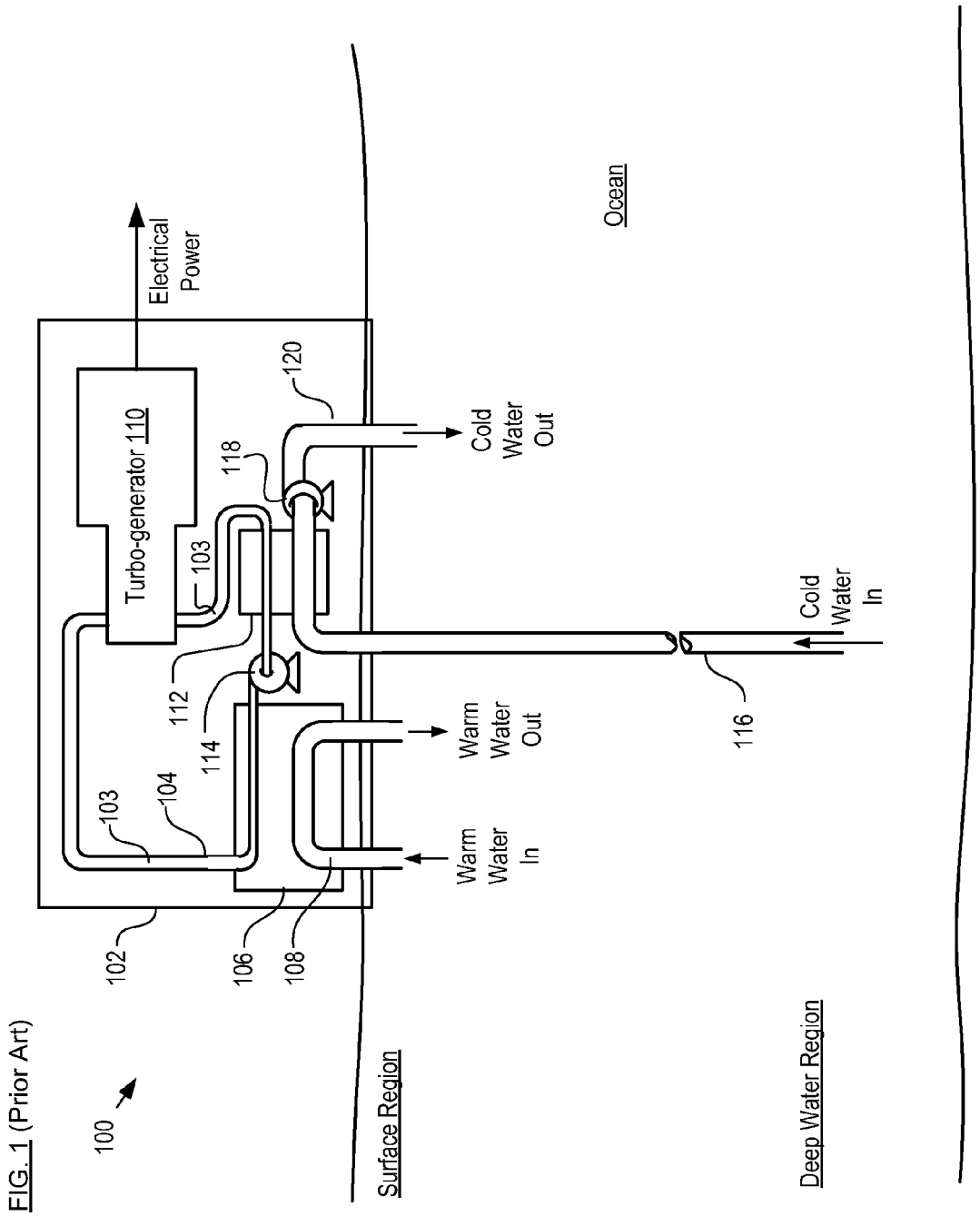
FIG. 1 depicts a conventional OTEC plant.
Figure 2:
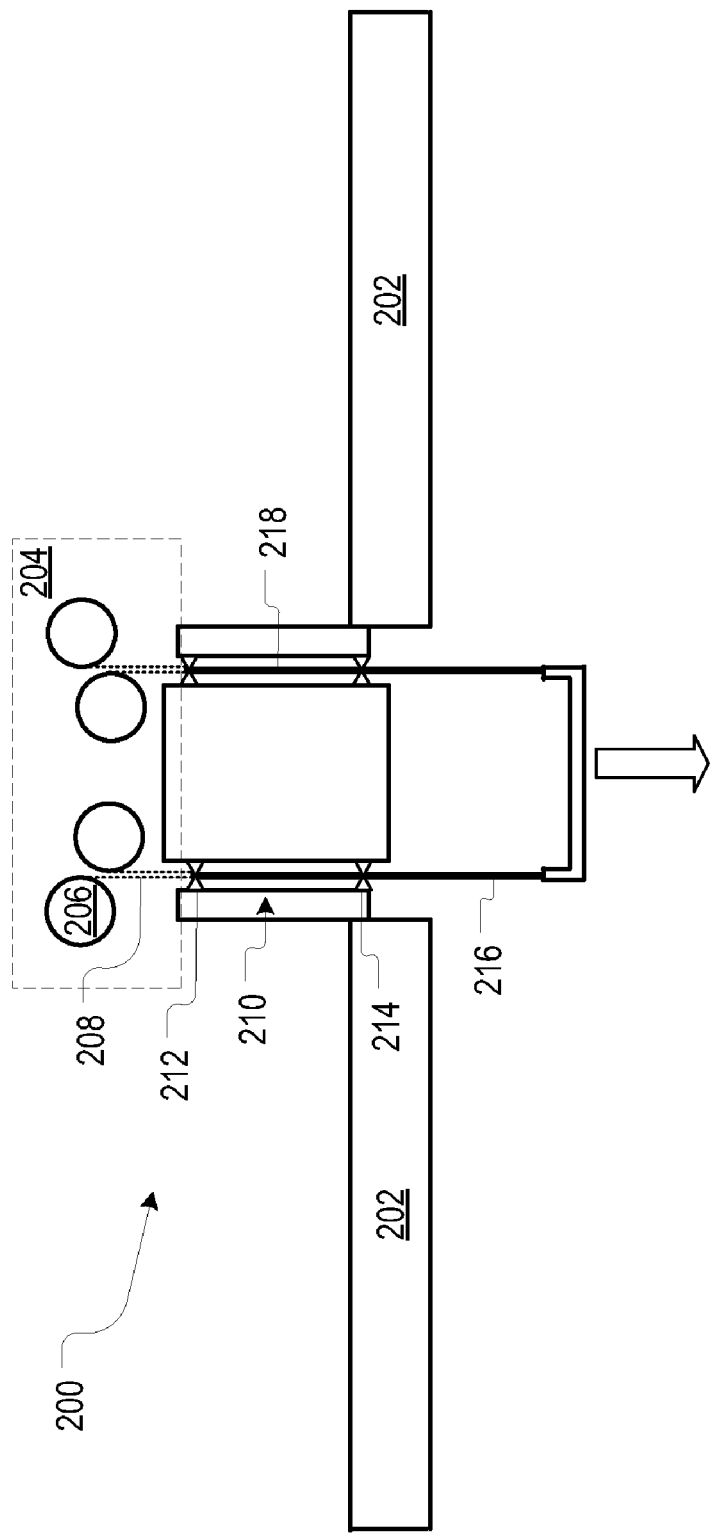
FIG. 2 depicts step-wise molding of a long, vertical pipe in accordance with the method and apparatus disclosed in U.S. patent application Ser. No. 12/484,779.
Figure 3:
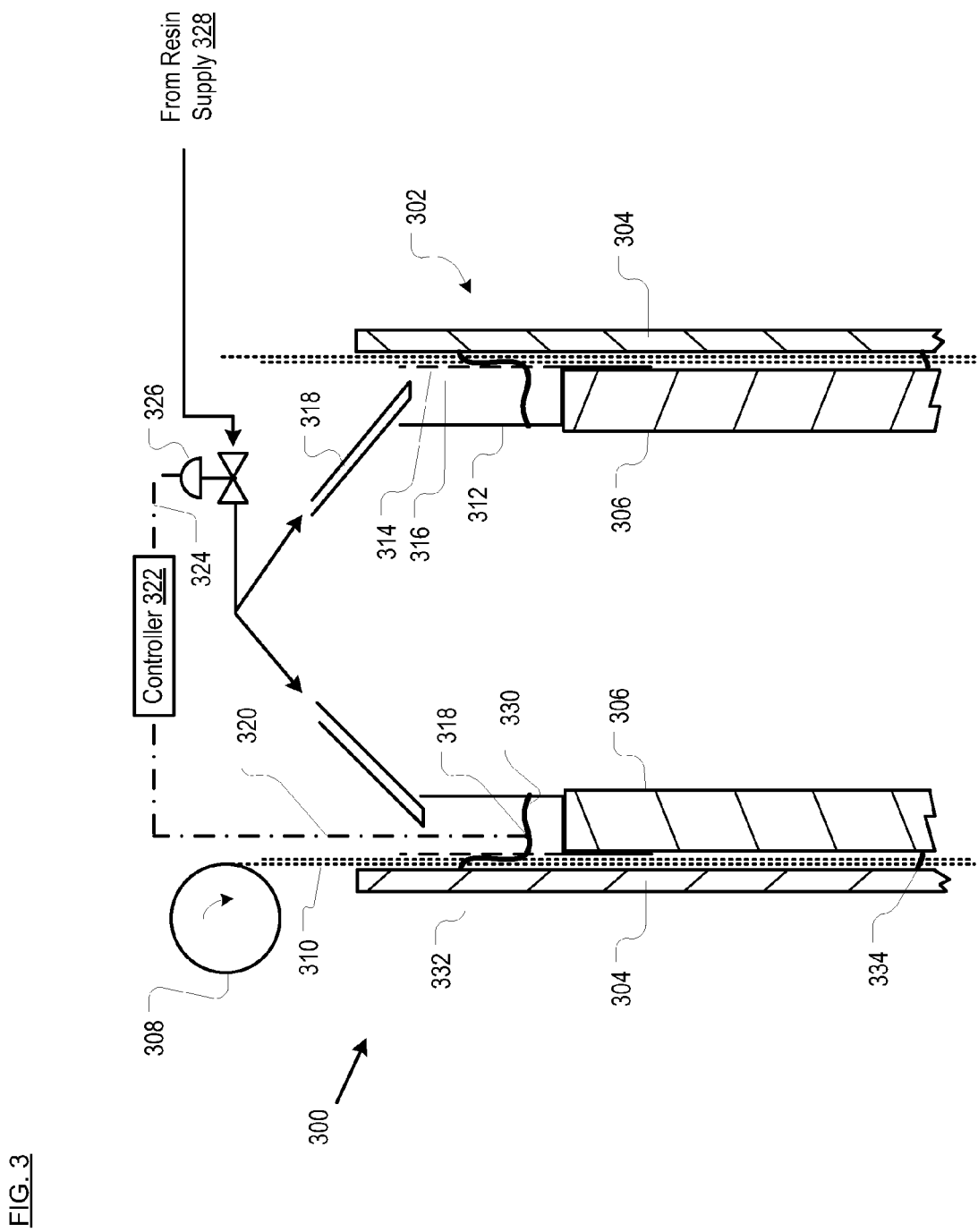
FIG. 3 depicts an upper seal for use in a process for stepwise molding of a long, vertical article.

FIG. 3 depicts an upper seal in accordance with the illustrative embodiment of the present invention, as used in the conjunction with a process and apparatus for molding continuous-fiber composite articles.

Apparatus 300 comprises molding region 302, which is an annular region defined between tooling (i.e., outer mold 304 and inner mold 306), fabric rolls 308, annular resin reservoir 312, perforated pressure plate 314, and controller 322.

FIG. 3 is a cross-sectional view of apparatus 300; as a consequence, the mirror image structures shown in the Figure are simply diametrically-opposed portions of the apparatus. The arrangement depicted in FIG. 3, which includes inner mold 306, is for a resin transfer molding process. In other embodiments, the upper seal disclosed herein can be used in conjunction with a VARTM process. In that case, inner mold 306 would be replaced by a vacuum bag.

Liquid resin is maintained in the upper seal area by means resin reservoir 312, which is immediately adjacent to fabric 310. The fabric is fed to molding region 302 from plural rolls 308 of fabric (only one roll is depicted for clarity). The liquid resin residing between the fibers of fabric 310 prevents ambient air from leaking in when vacuum is pulled on the fabric within molding region 302. Reservoir 312 is supplied, for example, by lines 318 that lead from an on-line mixer (not depicted) that mixes catalyst and resin in correct proportion.

In operation, perforated pressure plate 314 presses on fabric 310 in order to compact it, during cure, to the same configuration and fiber volume fraction as the rest of the article being formed, thereby maintaining shape continuity along the length of the pipe. Perforations 316 in pressure plate 314 enable the liquid resin to penetrate fabric 310 from annular reservoir 312.

Compaction of fabric 310 also minimizes the degree to which liquid resin flows through the fabric within the seal, before the resin is cured. This is true regardless of whether the region being processed is under vacuum, as in VARTM processing, or under pressure that is higher than ambient, as in RTM processing.

Active control is used to maintain resin in annular reservoir 312 at a level 330 that is high enough from the bottom of the reservoir to ensure that fabric 310 in the region of the seal stays filled with resin (e.g., to level 332, etc.) but low enough to make sure that wicking of the resin up the fabric does not carry resin above perforated pressure plate 314. As a consequence, the entire region of the seal that is filled with liquid resin at the beginning of any one processing step, and filled with cured resin at the end of that step, such that the workpiece has been maintained in the desired configuration and achieves the desired fiber volume fraction.

Active control is accomplished, in some embodiments, as follows. Liquid level sensor 318, which monitors resin level in reservoir 312, sends a signal over line 320 to controller 322. The controller compares the level to a set-point, which represents the desired resin level, and determines whether resin flow should be adjusted (i.e., stopped, started, etc.) to maintain the desired resin level. Based on that determination, a signal is sent over line 324 to flow control valve 326, which controls the flow of resin from resin supply 328 to resin supply lines 318. Various techniques for feedback or feedforward control, as known to those skilled in the art, can suitably be used to improve control.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for use with a multi-shot, continuous-fiber resin transfer molding process, wherein a continuous feed of fabric is provided to tooling, and wherein at a top of the tooling there is an interface between unprocessed fabric in a fabric-storage region and the fabric being processed by the tooling in a molding region, and wherein, for at least a portion of the time that the fabric is being processed, a first pressure in the fabric-storage region is different from a second pressure in the molding region, wherein the method comprises:
feeding the fabric vertically downward to the molding region, wherein continuity of fiber is maintained between the unprocessed fabric in the fabric-storage region and the fabric in the molding region; and maintaining resin at a first level in a resin reservoir that is disposed at a top of the molding region, the first level being sufficient to ensure that the fabric being processed that is near to and below the interface remains full of resin.

2. The method of claim 1 wherein the tooling includes an outer mold and an inner mold.

3. The method of claim 1 wherein the tooling includes an outer mold and a vacuum bag.

4. The method of claim 1 wherein the operation of maintaining resin at a first level seals the fabric being processed in the molding region from the unprocessed fabric.

5. The method of claim 4 wherein the operation of maintaining resin at a first level in a resin reservoir further comprises:
monitoring a level of the resin in the resin reservoir;
adjusting a flow of resin to the resin reservoir based on a result of the monitoring.

6. The method of claim 5 wherein the operation of monitoring further comprises sending a signal to a controller, wherein the signal is indicative of the level of the resin in the resin reservoir.

7. The method of claim 6 wherein the operation of adjusting comprises sending a signal from the controller to a control valve, wherein the control valve affects the amount of resin delivered to the resin reservoir.

8. The method of claim 1 further comprising curing the resin in the molding region, thereby providing a first workpiece.

9. The method of claim 8 further comprising releasing the first workpiece from the molding region, thereby simultaneously drawing additional fabric into the molding region due to the continuity of fiber between the fabric in the fabric storage region and the fabric in the first workpiece.

10. A method for use with a multi-shot, continuous-fiber resin transfer molding process, wherein a continuous feed of fabric is provided to tooling, and wherein at a top of the tooling there is an interface between the fabric in a fabric-storage region and the fabric being processed by the tooling in the molding region, and wherein, for at least a portion of the time that the fabric is being processed, a first pressure in the fabric-storage region is different from a second pressure in the molding region, wherein the method comprises:
feeding the fabric vertically downward to the molding region, wherein continuity of fiber is maintained between the fabric in the fabric-storage region and the fabric in the molding region; and;
actively controlling a level of resin in the molding region such that fabric being processed that is near the interface remains full of resin, wherein the level is actively controlled by sensing the level of resin in a reservoir.

11. The method of claim 10 wherein the first pressure is greater than the second pressure.

12. The method of claim 11 wherein the operation of actively controlling the level of resin further comprises sending a signal indicative of the sensed level to a controller.

13. The method of claim 11 wherein the operation of actively controlling the level of resin further comprises adjusting, based on the sensed level of resin, the flow of resin through a flow control valve that delivers resin to the reservoir.

14. A method for use with a multi-shot, continuous-fiber resin transfer molding process, comprising:
feeding a fabric is fed continuously, and vertically downward, from a fabric storage region to tooling, wherein at a top of the tooling there is an interface between the fabric in a fabric-storage region and the fabric being processed by the tooling in the molding region;

establishing a gas-tight seal between fabric in the fabric-storage region and the fabric in the molding region by maintaining a level of resin in the molding region such that fabric being processed that is proximal to the interface remains full of resin;

curing the resin in the molding resin, thereby providing a first work piece; and releasing the first work piece from the molding region, thereby simultaneously drawing additional fabric into the molding region due to the continuity of fiber between the fabric in the fabric storage region and the fabric in the first work piece.

15. The method of claim 14 wherein the step of establishing a gas-tight seal further comprises maintaining a level of resin in a resin reservoir that delivers resin to the fabric in the molding region.

* * * * *